(12) United States Patent
Bauer et al.

(10) Patent No.: US 6,576,720 B2
(45) Date of Patent: Jun. 10, 2003

(54) PREPARATION OF POLYVINYL ALCOHOL

(75) Inventors: Werner Bauer, Winhoering (DE); Peter Ball, Emmerting (DE); Peter Tschirner, Emmerting (DE)

(73) Assignee: Wacker Polymer Systems GmbH & Co. KG (DE)

(*) Notice: Subject to any disclaimer, the term of this patent is extended or adjusted under 35 U.S.C. 154(b) by 0 days.

(21) Appl. No.: 10/071,831

(22) Filed: Feb. 7, 2002

(65) Prior Publication Data

US 2002/0151660 A1 Oct. 17, 2002

(30) Foreign Application Priority Data

Feb. 8, 2001 (DE) .......................... 101 05 656

(51) Int. Cl.$^7$ ................................. C08F 2/06
(52) U.S. Cl. ............... 526/70; 526/89; 526/72; 526/319; 526/320; 526/330
(58) Field of Search ................ 526/319, 330, 526/320, 72, 89, 70

(56) References Cited

U.S. PATENT DOCUMENTS

| | | |
|---|---|---|
| 2,643,994 A | 6/1953 | Germain |
| 3,156,678 A | 11/1964 | Dexheimer et al. |
| 3,278,505 A | 10/1966 | Kominami |
| 3,316,230 A | 4/1967 | Tanner |
| 3,487,060 A | 12/1969 | Bristol |
| 4,401,790 A | 8/1983 | ter Jung et al. |

FOREIGN PATENT DOCUMENTS

| | | | |
|---|---|---|---|
| DD | 238054 | | 8/1986 |
| DD | 251683 | | 11/1987 |
| DE | 1206158 | | 12/1965 |
| DE | 1909170 | | 9/1969 |
| DE | 1909172 | | 9/1969 |
| DE | 2251603 | | 4/1974 |
| DE | 2304684 | | 8/1974 |
| DE | 30 00 750 A1 | | 7/1981 |
| DE | 3000750 | | 7/1981 |
| DE | 238054 | * | 8/1986 |
| EP | 0 044 027 A1 | | 1/1982 |
| EP | 0054716 | | 3/1986 |
| EP | 0942008 | | 9/1999 |
| FR | 832065 | | 6/1938 |
| FR | 607326 | | 2/1962 |
| GB | 694463 | | 7/1953 |
| GB | 749458 | | 5/1956 |
| GB | 973883 | | 10/1964 |
| GB | 1422027 | | 1/1976 |
| GB | 1 456 164 | | 11/1976 |

OTHER PUBLICATIONS

Derwent Abstract corresponding to DE 3000750 [AN 1981–535440].
Caplus Abstract corresponding to FR 832065 [AN 1939:17268].
Chemisches Zentralblatt 1939/II, p. 2382.
Derwent Abstract corresponding to DE 2304684 [AN 1974–57112V].
Derwent Abstract corresponding to DD 251683 [AN 1988—106026].
Derwent Abstract corresponding to DD 238054 [AN 1986—319637].
German Abstract corresponding to U.S. 2,643,994 cited in the German Examination Report [D15].
Hochmolekularbericht 1962, Ref. H., 3589/62.
Caplus Abstract corresponding to DE 1206158 [AN 1966:28193].
Chemisches Zentralblatt 1966, H.47, Ref. 2989.
Hochmolekularbericht 1966, Ref. H., 1319–66.
Hochmolekularbericht 1968, Ref. H., 2468/68.
Caplus Abstract corresponding to DE 1909170 [AN 1970:44633].
Patent Schellbericht, Part C 1970, Ref. C10–098170.
Caplus Abstract corresponding to DE 1909172 [An 1969:525495].
Hochmolekularbericht 1970, Ref. H., 7051/70.
Derwent Abstract Corresponding To DE–A 3000750 [AN 1981–535440].
Chemical Abstracts, vol. 85, No. 4, 07/26176, Abstract No. 22137g Corresponding To RO–A 58177.
Derwent Abstract Corresponding To JP–A 56120707 [AN 1981–822620].

\* cited by examiner

*Primary Examiner*—David W. Wu
*Assistant Examiner*—William K Cheung
(74) *Attorney, Agent, or Firm*—Brooks & Kushman P.C.

(57) ABSTRACT

A process for preparing polyvinyl alcohol by means of catalytic transesterification of an alcoholic polyvinyl ester solution and subsequent workup by means of isolation of the polyvinyl alcohol formed includes adding, prior to the transesterification of the polyvinyl ester solution, the acetic ester of the alcohol used as solvent, in an amount of from 5 to 70% by weight, based on the overall amount of alcoholic solvent and its acetic ester, and recycling the liquid phase obtained after isolation of the polyvinyl alcohol product to a further polyvinyl ester transesterification.

11 Claims, No Drawings

PREPARATION OF POLYVINYL ALCOHOL

BACKGROUND OF THE INVENTION

1. Field of the Invention

The invention relates to a process for preparing polyvinyl alcohol by means of catalytic transesterification of an alcoholic polyvinyl ester solution and subsequent isolation of the polyvinyl alcohol formed.

2. Background Art

The preparation of polyvinyl alcohol (PVAL) by transesterifying polyvinyl esters obtained by free-radical polymerization of vinyl esters has long been known. Vinyl esters that can be used include esters of aliphatic carboxylic acids, such as vinyl acetate or vinyl propionate, for example. The transesterification usually takes place in the presence of monohydric aliphatic alcohols such as methanol or ethanol. The reaction may take place with either basic or acidic catalysis. The polyvinyl alcohols obtained are described primarily by their degree of hydrolysis and their viscosity in a 4% by weight aqueous solution.

Another characteristic frequently encountered instead of the degree of hydrolysis is the saponification number, which indicates the amount of KOH in milligrams per gram of PVAL that is needed for complete cleavage of all of the remaining ester groups. The saponification number indicates only the mean value of the KOH consumption for complete ester cleavage. For identical measured saponification numbers, therefore, it is possible for distinctly different breadths of the saponification number distribution to occur. Both the breadth of the saponification number distribution and blockiness have a great influence on the quality of the PVAL, especially for its use as a protective colloid in emulsion and suspension polymerization.

For identical saponification number and viscosity, there are nevertheless distinct differences in the makeup of polyvinyl alcohols depending on the preparation process. As an initial consideration, the esters groups remaining may be distributed differently, for example concentrated in relatively large blocks or distributed randomly. When basic catalysts are used, the polyvinyl alcohols obtained tend to be blocky; when using acidic catalysts, polyvinyl alcohols with random distribution of remaining ester groups are more likely to be obtained. Additions of other solvents, such as water, also influence the distribution of the ester groups in the polyvinyl alcohol.

One established process for preparing polyvinyl alcohol is known as the belt process, and is described, for example, in U.S. Pat. No. 3,278,505 and DE-A 2251603. In this process, aqueous alkali is mixed rapidly and thoroughly with generally methanolic polyvinyl acetate solution and the mixture is applied to a continuous belt. The mixture solidifies to a gel, which at the end of the belt is fractionated and cut. The resulting granules are generally neutralized with acetic acid and washed with methanol. This continuous process is especially suitable for preparing polyvinyl alcohol in large amounts, an advantage being very economical preparation of large amounts of polyvinyl alcohol with uniform product quality. A disadvantage is that the granulated gel is difficult to neutralize; associated with this difficulty is an undesirable increase in the breadth of the saponification number distribution. The process is economical only for the production of large amounts of PVAL. It is therefore prohibitive to employ for the introduction of new and innovative products in quantities which, at commencement of production, are small. Further disadvantages include the high acquisition costs and the large amount of space occupied by the plant.

A process very similar to the belt process is the extruder process, which is described, for example, in EP-B 54716 and EP-A 942008, in which the belt is replaced by an appropriate extruder. In this process, the gel is comminuted in the extruder during the reaction. In comparison to the belt process, the extruder process can be used to process more highly concentrated polyvinyl acetate solutions. A disadvantage are the acquisition costs, which are even higher than those for the belt process, at identical capacities.

Another continuous process which has been described is the suspension transesterification of polyvinyl acetate, U.S. Pat. No. 3,487,060, for example. Here, the polyvinyl acetate solution and the catalyst solution are added continuously to an agitated alcoholysis mixture, and a slurry of polyvinyl alcohol in methanol and methyl acetate is removed continuously from this alcoholysis mixture. By means of an appropriate process regime, gel formation can be substantially prevented. In comparison to the other continuous processes, the acquisition costs are relatively low. However, it is difficult to maintain a specific degree of hydrolysis, and thus product uniformity suffers as a result.

Among the principal established noncontinuous processes is that of transesterification in a kneading apparatus, which is described, for example, in DE-A 3000750. A highly concentrated, generally methanolic, polyvinyl acetate solution is mixed with the transesterification catalyst. The resulting gel is progressively comminuted during the reaction. Following termination of the reaction with acid, methanol and methyl acetate formed in the kneading apparatus are separated by distillation. off. The kneading apparatus is very well suited to producing small quantities of polyvinyl alcohol specialties. Large amounts of a product are difficult to produce at favorable cost, however. Since the kneading apparatus is a poor mixer, both for the mixing in of the catalyst and for the addition of acid upon neutralization, the resultant polyvinyl alcohols have very broad saponification number distributions.

The transesterification of polyvinyl acetate to polyvinyl alcohol may also take place in a standard stirred tank, as is described, for example, in DE-A 2304684. Dilute, generally methanolic, polyvinyl acetate solutions are mixed with the catalyst. By progressive stirring, the gel is comminuted and a very fine suspension of polyvinyl alcohol in methanol/methyl acetate is obtained. As a result of the rapid distribution of the catalyst in the alcoholic solution and the uniform termination of the reaction with an acid in the fine suspension, it is possible to obtain polyvinyl alcohols of very good quality with a narrow saponification number distribution. Besides the solid polyvinyl alcohol obtained as a result of separating the solvent mixture, it is possible to distill off methyl acetate/methanol and at the same time to add water, in order to obtain an aqueous polyvinyl alcohol solution. A disadvantage is that owing to the poor filterability of the fine suspension, the preparation of solid polyvinyl alcohol by this process is not economical. Furthermore, large amounts of solvent must be distilled from the stirred tank and subsequently worked up by distillation. The twofold distillation represents a time-consuming and energy-intensive process. For separating methyl acetate and methanol, moreover, a plurality of distillation columns are required.

From DD-A 251683 it is known that the production of the aqueous solution may be accelerated by isolating the polyvinyl alcohol from the reaction mixture and introducing it, at a residual moisture content of more than 50% by weight, into a water-filled dissolution tank. If vacuum is applied, superheated steam introduced, and at the same time the dissolution tank is heated, methanol, methyl acetate, and water are distilled away and the polyvinyl alcohol goes into solution. This still leaves the problem of the poor filterability of the polyvinyl alcohol suspension. Another disadvantage of this process is that there are large quantities of filtrate to be reprocessed.

It is known that the filterability of the resulting polyvinyl alcohol suspension may be improved significantly by the addition of aliphatic or cycloaliphatic hydrocarbons. For example, DD-A 238054 describes producing a heterogenous methanolic polyvinyl acetate solution by adding 20–50% of hydrocarbons with a chain length of from 5 to 10 carbon atoms. Alkali-catalyzed transesterification conducted in this mixture leads to finely particulate, but readily filterable polyvinyl alcohol suspensions. The partially saponified polyvinyl alcohols obtained exhibit particularly good properties as protective colloids. A disadvantage of the process is that the resulting mixtures of hydrocarbon, methanol, and methyl acetate formed are very difficult to reprocess.

SUMMARY OF THE INVENTION

It is an object of the invention to develop a process for preparing polyvinyl alcohol wherein the filterability of the resulting polyvinyl alcohol suspension is improved. A further object of the invention is to develop a process which does not entail large quantities of solvent requiring distillative workup. The invention thus provides a process for preparing polyvinyl alcohol by means of catalytic transesterification of an alcoholic polyvinyl ester solution and subsequent workup by means of isolation of the polyvinyl alcohol formed, the process comprising adding the acetic ester of the alcohol used as solvent in an amount of from 5 to 70% by weight, based on the overall amount of alcoholic solvent and its acetic ester prior to transesterfication of the polyvinyl ester solution.

DETAILED DESCRIPTION OF THE PREFERRED EMBODIMENT(S)

In a preferred embodiment, the polyvinyl alcohol formed in the transesterification is isolated from the liquid phase and the liquid phase is recycled to the transesterification in amounts such that the fraction of the acetic ester of the alcohol used as solvent (termed "acetic ester" herein) in the alcohol/acetic ester mixture remains within the range of 5 to 70 weight percent during the transesterification.

Suitable polyvinyl esters are the homopolymers and copolymers with vinyl esters of aliphatic carboxylic acids having from 1 to 12 carbon atoms, such as vinyl formate, vinyl acetate, vinyl propionate, and also vinyl esters of alpha-branched carboxylic acids having from 9 to 10 carbon atoms (VeoVa 9 or VeoVa 10, trade names of Shell). If desired, the polymers may also include up to 50% by weight of comonomer units which derive from further, ethylenically unsaturated comonomers which are copolymerizable with vinyl esters. Examples include olefins such as ethylene and propylene, and also ethylenically unsaturated monocarboxylic and dicarboxylic acids such as acrylic acid or methacrylic acid, ethylenically unsaturated carboxamides such as acrylamide and N-methylolacrylamide, and isopropenyl acetate. The most preferred polyvinyl ester is polyvinyl acetate.

Suitable alcoholic solvents for the polyvinyl esters are monohydric aliphatic alcohols having from 1 to 4 carbon atoms or mixtures thereof, preferably methanol or ethanol, with particular preference being given to methanol. The amount of polyvinyl ester in the solution is from 20 to 80% by weight, preferably from 30 to 70% by weight. Before the onset of transesterification, acetic ester and, where appropriate, alcohol, are added to the polyvinyl ester solution in an amount such that the amount of acetic acid is from 5 to 70% by weight, preferably from 15 to 40% by weight, most preferably from 25 to 35% by weight, based in each case on the overall amount of alcoholic solvent and acetic ester. The amount of polyvinyl ester relative to the overall amount of the reaction mixture is from 2 to 75% by weight, preferably from 5 to 60% by weight. If methanol is used as solvent, methyl acetate is added as the acetic ester; in the case of ethanol as the solvent, ethyl acetate is added as the acetic ester. The addition of acetic ester takes place preferably in the form of an alcohol/acetic ester mixture which has been obtained as a filtrate during the workup of a preceding batch when batchwise operation is employed or isolated during the workup of the end product (polyvinyl alcohol) in continuous process.

The transesterification is initiated using customary acidic or alkaline catalysts. Examples of acidic catalysts are strong mineral acids such as hydrochloric acid or sulfuric acid, or strong organic acids, such as aliphatic or aromatic sulfonic acids. It is preferred to use alkaline catalysts. Examples of these catalysts are the hydroxides, alkoxides, and carbonates of alkali metals or alkaline earth metals. Preference is given to the hydroxides of lithium, sodium, and potassium; sodium hydroxide is particularly preferred. The alkaline catalysts are used in the form of their aqueous or alcoholic solutions, preferably in alcoholic solution, and with particular preference in the same alcohol that is used to dissolve the polyvinyl ester. The amounts of alkaline catalyst used are generally from 0.2 to 20.0 mol %, based on polyvinyl ester.

The transesterification is generally conducted at temperatures from 20° C. to 60° C., preferably from 30° C. to 40° C. In batchwise operation, the alcoholic polyvinyl ester solution is supplied to a reaction vessel, generally a stirred tank or a kneading apparatus, and acetic ester is added in an amount such as to give the abovementioned proportions of alcohol to acetic ester. To this end, a preferred procedure is to use the filtrate from preceding batches and to add, where appropriate, further alcohol or acetic ester in order to establish the desired proportion. Where appropriate, the batch may also be overlaid with filtrate or alcohol, taking into account said proportions of alcohol to acetic ester in the reaction vessel.

The transesterification is initiated by adding the catalyst solution. When the desired degree of hydrolysis, generally between 70 and 100 mol %, has been reached, the transesterification is terminated. In the case of acid-catalyzed transesterification, termination is effected by adding alkaline reagents. Examples of these are the hydroxides, alkoxides, and carbonates of alkali metals or alkaline earth metals. Preference is given to the hydroxides of lithium, sodium, and potassium; sodium hydroxide is particularly preferred. In the case of the preferred alkali-catalyzed tranesterification, termination is effected by adding acidic reagents, such as carboxylic acids or mineral acids. Preference is given to relatively strong carboxylic acids and mineral acids, preferably having a $pK_a$ of less then 4.5, with particular preference a $pK_a$ of less then 2.5. Examples of suitable mineral acids are hydrochloric acid, sulfuric acid, and nitric acid; examples of suitable carboxylic acids are oxalic acid, formic acid, aromatic and aliphatic sulfonic acids, and halocarboxylic acids, such as mono-, di,- or trichloroacetic acid.

After the end of the transesterification reaction, the polyvinyl alcohol formed during the transesterification is isolated from the liquid phase. This may be done by means of customary apparatus for solid/liquid separation, such as by centrifuging or filtration, for example. The resultant filtrate is preferably recycled to the reaction vessel for producing the subsequent batches. The recycle rate depends on the alcohol/acetic ester ratio used. Generally speaking, from 10 to 90% by weight, preferably from 50 to 80% by weight, of the filtrate is reused in subsequent batches.

The polyvinyl alcohol filtercake may be worked up conventionally, for example by drying and removing residual fractions of the alcohol/acetic ester mixture during the drying operation. The polyvinyl alcohol filtercake may also be taken up in water, usually with the production of an aqueous solution with a polyvinyl alcohol fraction of from 5 to 80% by weight, preferably from 10 to 50% by weight, with particular preference from 10 to 30% by weight, followed by subsequent vacuum treatment and/or stripping of the solution by passing inert gases such as steam over or through the solution, in order to remove residual fractions of alcohol and acetic ester.

In the case of a continuous operation, generally on a belt, or in a kneading apparatus or extruder, the alcoholic polyvinyl ester solution and the acetic ester are added in an amount such as to result in the abovementioned proportions of alcohol to acetic ester. For the addition of the acetic ester, it is preferred to add the alcohol/acetic ester mixture isolated in the workup of the end product, and, where appropriate, further alcohol or acetic ester in order to establish the desired proportion. The addition of the catalyst and the termination of reaction takes place in analogously to the batchwise operation. After the end of the reaction, the polyvinyl alcohol is isolated from the liquid phase. Isolation may be performed by the same procedure as described for batchwise operation, or by means of distillation. The resultant alcohol/acetic ester mixture may be recycled in the amounts specified for batchwise operation.

Owing to the addition of acetic ester before the beginning of the transesterification, the products obtained lead to polyvinyl alcohol suspensions that are more readily filtered. The principal advantage of the process is that, with transesterification in an alcohol/acetic ester mixture, the alcohol/acetic ester mixture obtained in the work up of the polyvinyl alcohol may be used again as the reaction medium, thereby avoiding the need to work up large amounts of solvent. Additionally, the preferred use of strong acids for the neutralization makes it possible to prevent the formation of buffer systems within the isolated alcohol/acetic ester mixture. When the solvent mixture separated off is to be used again as the reaction medium as in the present process, creation of a buffer system would result in increased alkali consumption. As a result, the polyvinyl alcohol obtained could contain an increased amount of residual salts, which frequently have disruptive effects on the end uses of the polyvinyl alcohol, for example as a protective colloid in emulsion and suspension polymerization.

The examples which follow serve to illustrate the invention.

EXAMPLE 1

Methanol:Methyl Acetate Ratio=70:30

In a 3-liter laboratory apparatus, 611 g of a 62% by weight methanolic polyvinyl acetate solution (viscosity as determined by the Höppler method=4.3 mPas, 10% by weight in ethyl acetate) were stirred together with 320 g of methanol, 335 g of methyl acetate and 3 g of water. After a homogenous solution had been obtained, it was overlaid with 183 g of methanol, with the stirrer stationary. Then 82 g of a 2.45% by weight solution of NaOH in methanol were added, whereupon the stirrer was restarted. At 30° C., the solution thickened after 12.5 minutes, and the gel which formed was comminuted by raising the speed of the stirrer. 42 minutes after the gel point, concentrated hydrochloric acid was added to the fine suspension until the sodium hydroxide still present had been neutralized. The polyvinyl alcohol product was isolated very effectively by suction filtration on a textile filter. Over the course of 5 minutes, a free-flowing polyvinyl alcohol composition having a solids content of 36% by weight was obtained.

After drying, the polyvinyl alcohol had a saponification number of 140 mg KOH/g PVAL, and a viscosity, as determined by the Höppler method, of 4.1 mPas (4% by weight in water).

The filtrate was collected, analyzed, and used in a subsequent batch. The composition of the filtrate was determined from the density.

EXAMPLES 2 to 5

Methanol:Methyl Acetate Ratio=70:30

In each case, 611 g of a 62% by weight methanolic polyvinyl acetate solution and the amount of filtrate, methanol, and methyl acetate indicated in Table 1 were introduced to a vessel and stirred to prepare a homogeneous solution. As in Example 1, the solution was overlaid with 183 g of methanol, and 82 g of a 2.45% by weight methanolic NaOH were added. The resulting gel point ("GP"), and the time ("N"), of neutralization are indicated in table 1. Working up of the batch and recycling of the filtrate followed the procedures of Example 1.

The results of the series from example 1 to example 5 are listed in table 1. Examples 1 to 5 show that the filtrate can be used again, in each case without substantial alterations to the formulation, and that the reaction times (GP, N) remain virtually identical. The amount of filtrate used is limited only by the amount of methanol or amount of methyl acetate it contains.

The products obtained were very uniform, with a virtually identical saponification number ("SN"). The ash content in the polyvinyl alcohol as well, which serves as a measure of the formation of byproducts, remained virtually constant.

TABLE 1

| Example | MeOH:MeAc filtrate [% by wt.] | $H_2O$ in the filtrate [% by wt.] | Amount of filtrate [g] | MeOH added [g] | MeAc added [g] | GP [min] | N after GP [min] | SN PVAL [mg KOH/g] | Ash PVAL [% by wt.] |
|---|---|---|---|---|---|---|---|---|---|
| 1 | | | | 320 | 335 | 12.5 | 42 | 140 | 0.4 |
| 2 | 50:50 | 1.2 | 640 | 0 | 15 | 13.5 | 42 | 142 | 0.7 |
| 3 | 52.5:47.5 | 0.88 | 560 | 26 | 67 | 13.0 | 42 | 141 | 0.6 |
| 4 | 50.7:49.3 | 0.65 | 631 | 0 | 23 | 13.5 | 42 | 144 | 0.5 |
| 5 | 50.9:49.1 | 1.41 | 570 | 30 | 55 | 15.0 | 42 | 133 | 0.6 |

EXAMPLE 6

Methanol:Methyl Acetate Ratio=70:30

In a 3-liter laboratory apparatus, 611 g of a 62% strength by weight methanolic polyvinyl acetate solution (viscosity as determined by the Höppler method=4.3 mPas, 10% by weight in ethyl acetate) were stirred together with 320 g of methanol, 335 g of methyl acetate and 3 g of water. After a homogenous solution had been obtained, it was overlaid with 183 g of methanol, with the stirrer stationary. Then, 82 g of a 2.45% by weight solution of NaOH in methanol were added, whereupon the stirrer was restarted. At 30° C., the solution thickened after 13 minutes, and the gel formed was comminuted by raising the speed of the stirrer. 40 minutes after the gel point (GP), oxalic acid was added to the fine suspension until the sodium hydroxide still present had been neutralized. The polyvinyl alcohol formed was isolated very effectively by suction filtration on a textile filter. Over the course of 5 minutes, a free-flowing polyvinyl alcohol having a solids content of 37% by weight was obtained.

After drying, the polyvinyl alcohol had a saponification number of 139 mg KOH/g PVAL and the viscosity, as determined by the Höppler method, was 4.2 mPas (4% by weight in water).

The filtrate was collected, analyzed, and used in the subsequent batch (Example 7). The composition of the filtrate was determined from the density.

EXAMPLE 7

Methanol:Methyl Acetate Ratio=70:30

611 g of a 62% by weight methanolic polyvinyl acetate solution and the amount of filtrate and methyl acetate indicated in table 2 were introduced into a vessel and stirred to produce a homogeneous solution. As in example 6, the solution was overlaid with 183 g of methanol, and 82 g of a 2.45% by weight methanolic NaOH were added. The resulting gel point, GP, and the time, N, of neutralization were noted. The workup of the batch followed that of Example 6. The polyvinyl alcohol from Example 7 was similarly very easy to filter. The results of Example 6 and Example 7 are given in Table 2. When the filtrate was reused in example 7, the reaction times (GP, N) remained virtually identical. Very uniform products with almost the same saponification number were obtained.

TABLE 2

| Ex | MeOH:MeAc filtrate [% by wt.] | Amount of filtrate [g] | MeOH added [g] | MeAc added [g] | GP [min] | N after GP [min] | SN PVAL [mg KOH/g] |
|---|---|---|---|---|---|---|---|
| 6 | | | 320 | 335 | 12 | 40 | 139 |
| 7 | 52.1:47.9 | 614 | 0 | 41 | 13.5 | 42 | 137 |

EXAMPLES 8 to 10

The procedure of example 6 was repeated using 611 g of a 62% by weight methanolic polyvinyl acetate solution and 183 g of methanol for overlaying. The amount of methyl acetate was varied as compared with Example 6. The polyvinyl alcohols from Examples 8 to 10 were very readily filterable.

Comparative Example C1

The procedure of Example 6 was repeated except that a methanol methyl acetate ratio of 96:4 was established.

The results in Table 3 show that the ratio of alcohol (methanol) to acetic ester (methyl acetate) may be varied within a wide range. Where the amount of methyl acetate in the mixture is less than 5% by weight, filterability is not improved. The greater the amount of methyl acetate in the mixture, the greater the amount of alkali required for transesterification and the greater the amount of salt formed—that is, the residual ash content of the polyvinyl alcohol goes up.

TABLE 3

| Example | MeOH:MeAc batch [% by wt.] | MeOH [g] | MeAc [g] | Alkali [g] | GP [min] | N after GP [min] | SN PVAL [mg KOH/g] | Filtrability |
|---|---|---|---|---|---|---|---|---|
| 6 | 70:30 | 320 | 335 | 82 | 12 | 40 | 139 | +++ |
| 8 | 85:15 | 480 | 175 | 72 | 18.5 | 55 | 138 | ++ |
| 9 | 45:55 | 0 | 655 | 96 | 5 | 120 | 220 | +++ |
| 10 | 45:55 | 0 | 655 | 120 | 5 | 40 | 130 | +++ |
| C1 | 96:4 | 600 | 50 | 55 | 25 | 25 | 136 | − |

EXAMPLE 11

Methanol:Methyl Acetate Ratio=85:15) (Amount of Polyvinyl Acetate: 30% by Weight Based on the Overall Amount of Reaction Mixture In a 140-liter stirred tank, 45.9 kg of a 62% by weight methanolic polyvinyl acetate solution (viscosity as determined by the Höppler method=4.4 mPas, 10% by weight in ethyl acetate) was stirred together with 18.9 kg of methanol, 9.9 kg of methyl acetate and 0.24 kg of water. When a homogeneous solution had been obtained, it was overlaid with 13.8 kg of methanol, with the stirrer stationary. Then 4.65 kg of a 2.45% by weight solution of NaOH in methanol were added and the stirrer was restarted. At 30° C., the solution thickened after 19 minutes, and the gel formed was comminuted by the stirrer.

38 minutes after the gel point, oxalic acid was added to the fine suspension until the sodium hydroxide still present was neutralized. The polyvinyl alcohol formed was filtered effectively using a pressure suction filter. A moist polyvinyl alcohol with a solids content of 38% by weight was obtained.

Drying gave a polyvinyl alcohol having a saponification number of 144 mg KOH/g PVAL and the viscosity as determined by the Höppler method was 4.25 mPas (4% by weight in water).

EXAMPLE 12

Methanol:Methyl Acetate Ratio=70:30; Amount of Polyvinyl Acetate: 30% by Weight Based on the Overall Amount of Reaction Mixture The procedure of Example 11 was repeated but 10.2 kg of methanol and 18.6 kg of methyl acetate were employed. The amount of 2.45% by weight methanolic alkali solution was 6.15 kg. The gel point was reached after 12 minutes, with neutralization 50 minutes after the gel point. The filtration took place as in Example 11. The saponification number of the polyvinyl alcohol was 133 mg KOH/g PVAL, and the viscosity as determined by the Höppler method was 4.35 mPas (4% by weight in water).

EXAMPLE 13

Methanol:Methyl Acetate Ratio=70:30; Amount of Polyvinyl Acetate: 15% by Weight Based on the Overall Amount of Reaction Mixture The procedure of Example 11 was repeated but 25 kg of a 62% by weight methanolic polyvinyl acetate solution were mixed with 34.2 kg of methanol and 26.0 kg of methyl acetate. The amount of methanolic alkali solution was 4.8 kg. The gel point was reached after 22 minutes, with alization 30 minutes after the gel point. The filtration took place as in Example 11. The saponification number of the polyvinyl alcohol was 127 mg KOH/g PVAL, and the viscosity as determined by the Höppler method was 4.3 mPas (4% by weight in water).

The results of Examples 11 to 13 are listed in table 4 and show that on the industrial scale as well, there is an improvement in filterability and that the amount of polyvinyl acetate as a proportion of the overall amount of the reaction mixture can be varied.

The filtrate contained 75.5% by weight methanol and 24.5% by weight methyl acetate.

Comparative Example 3

Neutralization With Acetic Acid

In a 3-liter laboratory apparatus, 611 g of a 62% by weight polyvinyl acetate solution (viscosity as determined by the Höppler method=4.3 mPas, 10% by weight in ethyl acetate) were stirred together with 320 g of methanol, 355 g of methyl acetate and 3 g of water. The homogenous solution was then overlaid with 183 g of methanol, with the stirrer stationary. Then 82 g of a 2.45% by weight solution of NaOH in methanol were added and the stirrer restarted. At 30° C., the solution thickened after 12.5 minutes, and the gel formed was comminuted by raising the stirrer speed. 42 minutes after the gel point, glacial acetic acid was added to the fine suspension until the sodium hydroxide still present had been neutralized. The PVAL formed lent itself very well to isolation by suction filtration on a textile filter. Over the course of 5 minutes, a free-flowing polyvinyl alcohol with a solids content of 36% by weight was obtained.

Drying gave a polyvinyl alcohol having a saponification number of 144 mg KOH/g PVAL and a viscosity, as determined by the Höppler method, of 4.15 mPas (4% by weight in water).

The filtrate was collected, analyzed, and used in a subsequent batch (Comparative Example C4).

TABLE 4

| Ex. | MeOH:MeAc [% by wt.] | MeOH [kg] | MeAc [kg] | Amount Of PVAc [% by wt.] | Alkali [kg] | GP [min] | N after GP [min] | SN PVAL [mg KOH/g] | Filterability |
|---|---|---|---|---|---|---|---|---|---|
| 11 | 85:15 | 18:9 | 9:9 | 30 | 4.65 | 19 | 38 | 144 | +++ |
| 12 | 70:30 | 10.2 | 18.6 | 30 | 6.15 | 12 | 50 | 133 | +++ |
| 13 | 70:30 | 34.2 | 26.0 | 15 | 4.80 | 22 | 30 | 127 | +++ |

Comparative Example C2

Batch Without Methyl Acetate

In a 3-liter laboratory apparatus, 611 g of a 62% by weight methanolic polyvinyl acetate solution (viscosity as determined by the Höppler method=4.3 mPas, 10% by weight in ethyl acetate) were stirred together with 655 g of methanol and 3 g of water. The homogenous solution was then overlaid with 183 g of methanol, with the stirrer stationary. Then 48 g of a 2.45% by weight solution of NaOH in methanol were added and the stirrer was restarted. At 30° C., the solution thickened after 31 minutes, and the gel formed was comminuted by raising the stirrer speed to 400 rpm. 50 minutes after the gel point, glacial acetic acid was added to the fine suspension until the sodium hydroxide still present had been neutralized.

The polyvinyl alcohol formed was very difficult to isolate by suction filtration on a textile filter. As compared with Examples 1 to 10, which all gave effective filtration over the course of about 5 minutes, in this case it took from 45 to 90 minutes to obtain a free-flowing polyvinyl alcohol having a solids content of 33% by weight.

Drying gave a polyvinyl alcohol having a saponification number of 135 mg KOH/g PVAL and a viscosity, as determined by the Höppler method, of 4.05 mPas (4% by weight in water).

Comparative Example C4

Filtrate from Batch With Acetic Acid Neutralization

The procedure of Comparative Example C2 was repeated except that, instead of methanol and methyl acetate, the stated amounts of filtrate from Comparative Example C3 and methyl acetate were used.

The results of Comparative Examples C2 to C4 are listed in Table 5.

In Comparative Example C2, it is shown that without the addition of methyl acetate prior to the transesterification, the resulting suspensions are difficult to filter. The filtering time was multiplied by a factor of from 10 to 20 relative to that in examples 1 to 10. In Comparative Example C3, acetic acid is used for neutralization.

Comparative Example C4 shows that the filtrate from Comparative Example C3 cannot be used again, as is preferred, in subsequent batches. In the subsequent batch (i.e., Comparative Example C4) the acetate buffer formed, which is readily soluble in methanol, would necessitate a larger amount of alkali, which would increase from one subsequent batch to the next. As a result, there would be a significant increase in the salt fractions in the polyvinyl alcohols obtained.

TABLE 4

| Comp. Ex. | MeOH:MeAc filtrate [% by wt.] | Filtrate [g] | MeOH [g] | MeAc [g] | GP [min] | N after GP [min] | SN PVAL [mg KOH/g] |
|---|---|---|---|---|---|---|---|
| C2 | | | 655 | | 31 | 50 | 135 |
| C3 | | | 320 | 335 | 12.5 | 42 | 144 |
| C4 | 50.5:49.5 | 640 | 0 | 15 | 70 | 210 | 380 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of polyvinyl alcohol by catalytic transesterification of a polyvinyl ester solution in a solvent comprising an alcohol, said process comprising:
    a) adding to said solution prior to tranesterification, the acetic ester of the alcohol solvent in an amount of from 5 weight percent to 70 weight percent based on the total amount of alcohol and its acetic ester;
    b) transesterifying the polyvinyl ester to obtain a polyvinyl alcohol product contained in a liquid phase;
    c) isolating the polyvinyl alcohol product from the liquid phase;
    d) recycling at least a portion of the liquid phase to a further polyvinyl ester transesterification in an alcohol and acetic ester mixture wherein the acetic ester is present in an amount of 5 weight percent to 70 weight percent based on the total amount of alcohol and acetic ester, optionally adding make-up alcohol, acetic ester, or both alcohol and acetic ester to adjust the acetic ester concentration to from 5 weight percent to 70 weight percent based on the total amount of alcohol and acetic ester in said further polyvinyl ester transesterification.

2. The process of claim 1 which is a batch process, and the liquid phase is recycled to a subsequent batch.

3. The process of claim 1 which is a continuous process wherein the liquid phase is recycled to provide at least a portion of an inlet stream to said continuous process.

4. The process of claim 1 wherein the portion of the liquid phase recycled is from 10% to 90% by weight.

5. The process of claim 1 wherein said polyvinyl ester comprises homopolymers and copolymers with vinyl esters of aliphatic carboxylic acids having from 1 to 12 carbon atoms.

6. The process of claim 1 wherein said polyvinyl ester comprises polyvinyl acetate.

7. The process of claim 1, wherein said alcohol solvent comprises at least one monohydric aliphatic alcohol having from 1 to 4 carbon atoms.

8. The process of claim 7, wherein said alcohol solvent comprises methanol and said acetic ester comprises methyl acetate.

9. The process of claims 1, wherein the a transesterification catalyst comprising an acid or alkali is employed.

10. The process of claim 9, wherein said alkali catalysts comprise hydroxides, alkoxides or carbonates of alkali metals and alkaline earth metals.

11. The process of claim 9, wherein the transesterification is terminated by adding at least one carboxylic acid or mineral acid having a $pK_a$ of less than 4.5.

* * * * *